US012369012B2

(12) United States Patent
Stockhammer et al.

(10) Patent No.: US 12,369,012 B2
(45) Date of Patent: Jul. 22, 2025

(54) MULTICAST-BROADCAST USER SERVICE ARCHITECTURE

(71) Applicant: QUALCOMM Incorporated, San Diego, CA (US)

(72) Inventors: Thomas Stockhammer, Bergen (DE); Imed Bouazizi, Frisco, TX (US); Charles Nung Lo, San Diego, CA (US); Miguel Griot, La Jolla, CA (US); Ralph Akram Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 17/811,386

(22) Filed: Jul. 8, 2022

(65) Prior Publication Data

US 2023/0052505 A1 Feb. 16, 2023

Related U.S. Application Data

(60) Provisional application No. 63/260,220, filed on Aug. 12, 2021.

(51) Int. Cl.
*H04W 4/06* (2009.01)
*H04W 4/12* (2009.01)

(52) U.S. Cl.
CPC ............. *H04W 4/06* (2013.01); *H04W 4/12* (2013.01)

(58) Field of Classification Search
CPC ......... H04W 4/06; H04W 4/12; H04W 76/40; H04L 12/184; H04L 12/189; H04L 65/611; H04L 65/612; H04L 65/80; H04L 67/02; H04L 67/14; H04L 67/141; H04L 67/146; H04L 67/147
See application file for complete search history.

(56) References Cited

U.S. PATENT DOCUMENTS

| 2008/0002021 A1* | 1/2008 | Guo | H04N 21/4722 348/21 |
| 2013/0290555 A1* | 10/2013 | Einarsson | H04N 21/6408 709/231 |
| 2014/0372624 A1* | 12/2014 | Wang | H04L 65/60 709/231 |

FOREIGN PATENT DOCUMENTS

| WO | WO-2006072825 A1 * | 7/2006 | .............. H04W 4/06 |

OTHER PUBLICATIONS ("3rd Generation Partnership Project; Technical Specification Group Services and System Aspects; Multicast Architecture Enhancement for 5G Media Streaming (Release 17)", 3GPP Standard; Technical Report; 3GPP TR 26.802, 3rd Generation Partnership Project) (Year: 2021).*

(Continued)

*Primary Examiner* — Cheikh T Ndiaye
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a multicast-broadcast user service description message. The UE may communicate, using a multicast-broadcast service (MBS) transport function (MBSTF) client, with an MBS entity of the network entity, in accordance with information included in the user service description message, wherein the MBS entity is split into a multicast delivery function and a unicast application server. Numerous other aspects are described.

30 Claims, 13 Drawing Sheets

(56) References Cited

OTHER PUBLICATIONS

3GPP TR 26.802: "3rd Generation Partnership Project, Technical Specification Group Services and System Aspects, Multicast Architecture Enhancement for 5G Media Streaming (Release 17)", 3GPP Standard, Technical Report, 3rd Generation Partnership Project, Mobile Competence Centre, 650, Route Des Lucioles, F-06921 Sophia-Antipolis Cedex, France, vol. SA WG4, No. V1.2. 8, May 11, 2021, pp. 1-67, XP052000975, paragraph [04.1]-[5.7.1.3].
International Search Report and Written Opinion—PCT/US2022/074113—ISA/EPO—Oct. 25, 2022.

\* cited by examiner

MULTICAST-BROADCAST USER SERVICE ARCHITECTURE

CROSS-REFERENCE TO RELATED APPLICATION

This Patent Application claims priority to U.S. Provisional Patent Application No. 63/260,220, filed on Aug. 12, 2021, entitled "MULTICAST-BROADCAST USER SERVICE ARCHITECTURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to a multicast-broadcast user service architecture.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a multicast-broadcast user service description message. The method may include communicating, using a multicast-broadcast service (MBS) transport function (MBSTF) client, with an MBS entity of the network entity, in accordance with information included in the user service description message, wherein the MBS entity is split into a multicast delivery function and a unicast application server.

Some aspects described herein relate to a method of wireless communication performed by a network entity. The method may include transmitting, to a UE, a multicast-broadcast user service description message. The method may include communicating, using an MBS entity, with an MBSTF client of the UE, in accordance with information included in the user service description message, wherein the MBS entity is split into a multicast delivery function and a unicast application server.

Some aspects described herein relate to a UE for wireless communication. The user equipment may include a memory and one or more processors coupled to the memory. The one or more processors may be configured to receive, from a network entity, a multicast-broadcast user service description message. The one or more processors may be configured to communicate, using an MBSTF client, with an MBS entity of the network entity, in accordance with information included in the user service description message, wherein the MBS entity is split into a multicast delivery function and a unicast application server.

Some aspects described herein relate to a network entity for wireless communication. The network entity may include a memory and one or more processors coupled to the memory. The one or more processors may be configured to transmit, to a UE, a multicast-broadcast user service description message. The one or more processors may be configured to communicate, using an MBS entity, with an MBSTF client of the UE, in accordance with information included in the user service description message, wherein the MBS entity is split into a multicast delivery function and a unicast application server.

Some aspects described herein relate to a non-transitory computer-readable medium that stores a set of instructions for wireless communication by a UE. The set of instructions, when executed by one or more processors of the UE, may cause the UE to receive, from a network entity, a multicast-broadcast user service description message. The set of instructions, when executed by one or more processors of the UE, may cause the UE to communicate, using an MBSTF client, with an MBS entity of the network entity, in accordance with information included in the user service description message, wherein the MBS entity is split into a multicast delivery function and a unicast application server.

Some aspects described herein relate to a non-transitory computer-readable medium that stores a set of instructions for wireless communication by a network entity. The set of instructions, when executed by one or more processors of the network entity, may cause the network entity to transmit, to a UE, a multicast-broadcast user service description message. The set of instructions, when executed by one or more processors of the network entity, may cause the network entity to communicate, using an MBS entity, with an MBSTF client of the UE, in accordance with information included in the user service description message, wherein the MBS entity is split into a multicast delivery function and a unicast application server.

Some aspects described herein relate to an apparatus for wireless communication. The apparatus may include means for receiving, from a network entity, a multicast-broadcast user service description message. The apparatus may include means for communicating, using an MBSTF client, with an MBS entity of the network entity, in accordance with information included in the user service description message, wherein the MBS entity is split into a multicast delivery function and a unicast application server.

Some aspects described herein relate to an apparatus for wireless communication. The apparatus may include means for transmitting, to a UE, a multicast-broadcast user service description message. The apparatus may include means for communicating, using an MBS entity, with an MBSTF client of the UE, in accordance with information included in the user service description message, wherein the MBS entity is split into a multicast delivery function and a unicast application server.

Aspects generally include a method, apparatus, system, computer program product, non-transitory computer-readable medium, user equipment, base station, network node, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
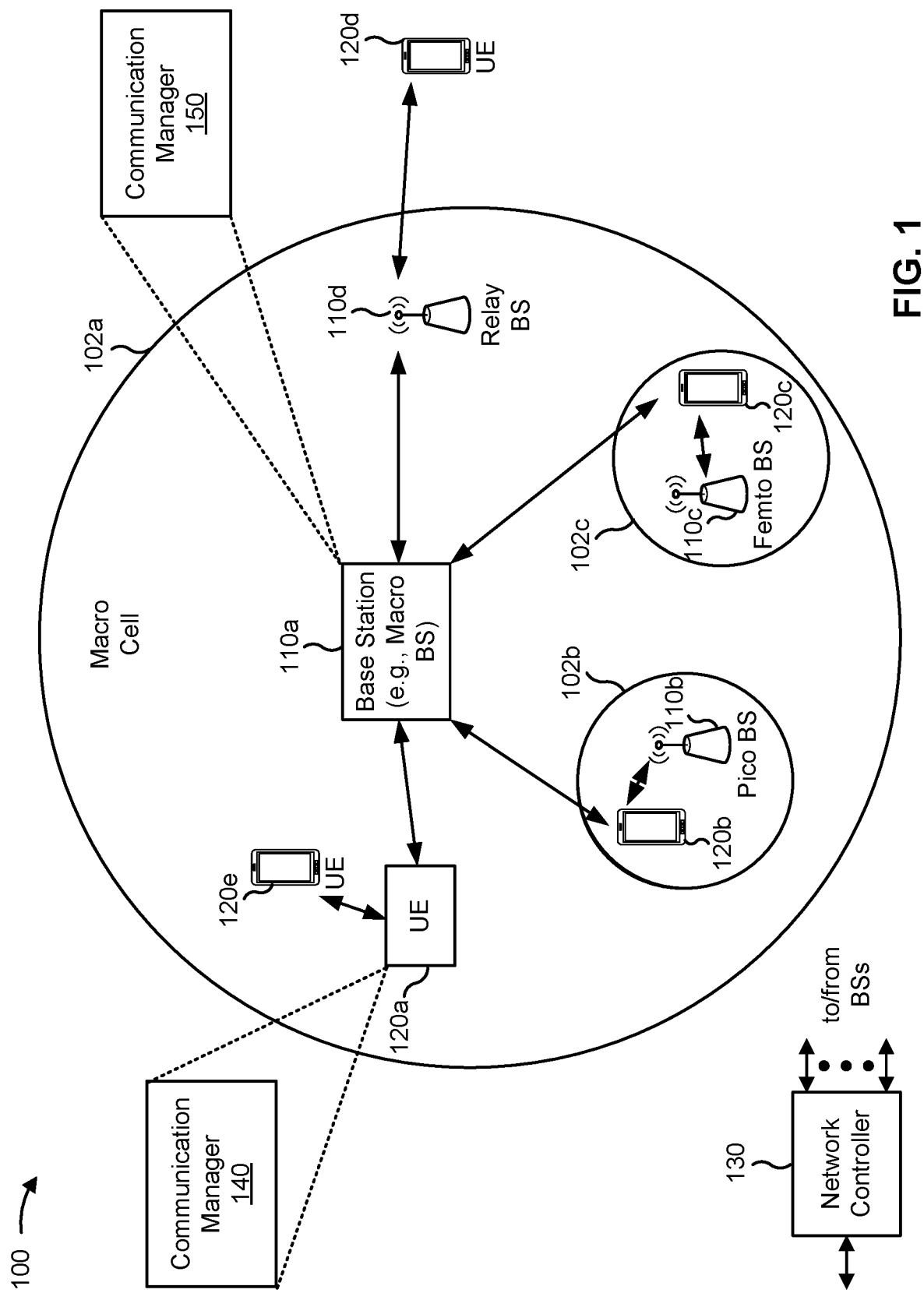
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the devices of FIG. 1 may facilitate communication with a core network such as a 5G core (5GC) and a network device thereof. The core network may include a variety of functional entities (e.g., network devices) to support services of the wireless network 100, such as multicast-broadcast service or streaming media services, among other examples. Additionally, or alternatively, one or more functional entities described herein as part of the core network may be implemented separately from the core network. In some aspects, the core network may include an access and mobility management function (AMF), a session management function (SMF), a user plane function (UPF), a unified data management (UDM) function, a multicast/broadcast (NB) SMF (MB-SMF), an MB UPF (MB-UPF), an MB service transport function (MB-STF), an MB service function (MBSF), a policy charging function (PCF), and/or a network exposure function (NEF).

One or more of these functions may perform functions to support a multicast-broadcast service (MBS), as described, for example, by a wireless communication specification such as one promulgated by the 3GPP. For example, the MB-SMF may handle session management, MB-UPF configuration for flow transport, interacting with the RAN to control data transport, protocol data unit (PDU) session modification, and so on. The MB-UPF may handle packet filtering, quality of service (QoS) enforcement, interaction with an MB-SMF to receive multicast and broadcast data, delivery of data to RAN nodes, and so on. The MBSF may support service level functionality to support MBS, interacting with an access function (AF) and MB-SMF for MBS session operations, determination of transport parameters, and session transport, selection of a serving MB-SMF for an MBS session, controlling an MBSTF if the MBSTF is used, and determination of a sender Internet Protocol (IP) multicast address for the MBS session if the IP multicast address is sourced by the MBSTF. The MBSTF may handle media anchoring for MBS data traffic, sourcing of IP multicast, generic packet transport functionalities, and multicast/broadcast delivery of input files as objects or object flows.

In some aspects, the UE 120 may include a communication manager 140. As described in more detail elsewhere herein, the communication manager 140 may receive, from a network entity, a multicast-broadcast user service description message; and communicate, using a multicast-broadcast service (MBS) transport function (MBBSTF) client, with an MBS entity of the network entity, in accordance with information included in the user service description message, wherein the MBS entity is split into a multicast delivery function and a unicast application server. Additionally, or alternatively, the communication manager 140 may perform one or more other operations described herein.

In some aspects, a network entity (e.g., the base station 110, a network device, or a core network device of a 5G system) may include a communication manager 150. As described in more detail elsewhere herein, the communication manager 150 may transmit, to a UE, a multicast-broadcast user service description message; and communicate, using an NBS entity, with an MBSTF client of the UE, in accordance with information included in the user service description message, wherein the NBS entity is split into a multicast delivery function and a unicast application server. Additionally, or alternatively, the communication manager 150 may perform one or more other operations described herein.

As indicated above, FIG. 1 is provided as an example. Other examples may differ from what is described with regard to FIG. 1.

Figure 2:
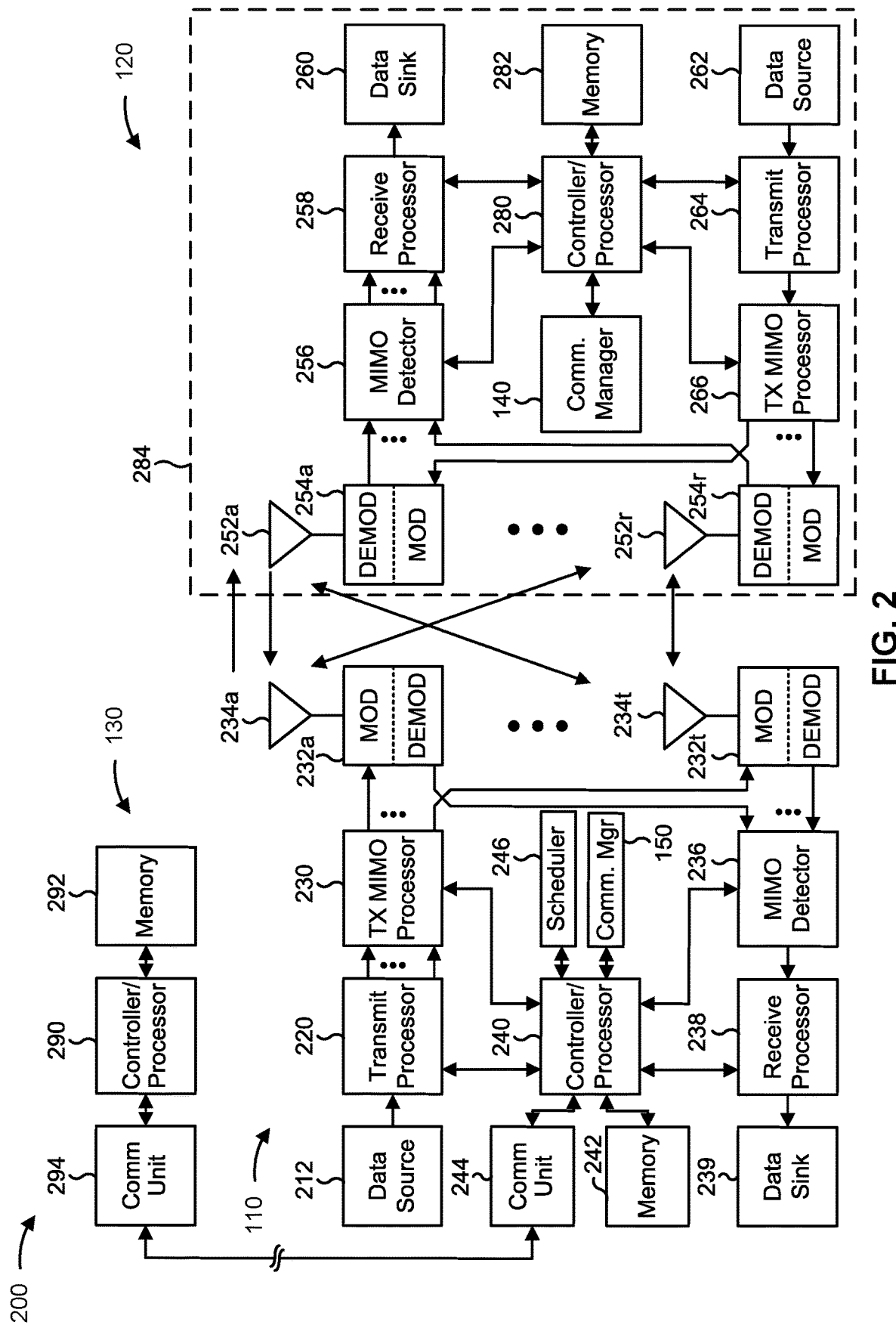
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the base station 110, the controller/processor 280 of the UE 120, and/or any other component(s) of FIG. 2 may perform one or more techniques associated with a multicast-broadcast user service architecture, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a multicast-broadcast user service description message; and/or means for communicating, using an MBSTF client, with an MBS entity of the network entity, in accordance with information included in the user service description message, wherein the MBS entity is split into a multicast delivery function and a unicast application server. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the base station 110 or a core network device of a 5G system) includes means for transmitting, to a UE, a multicast-broadcast user service description message; and/or means for communicating, using an MBS entity, with an MBSTF client of the UE, in accordance with information included in the user service description message, wherein the MBS entity is split into a multicast delivery function and a unicast application server. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
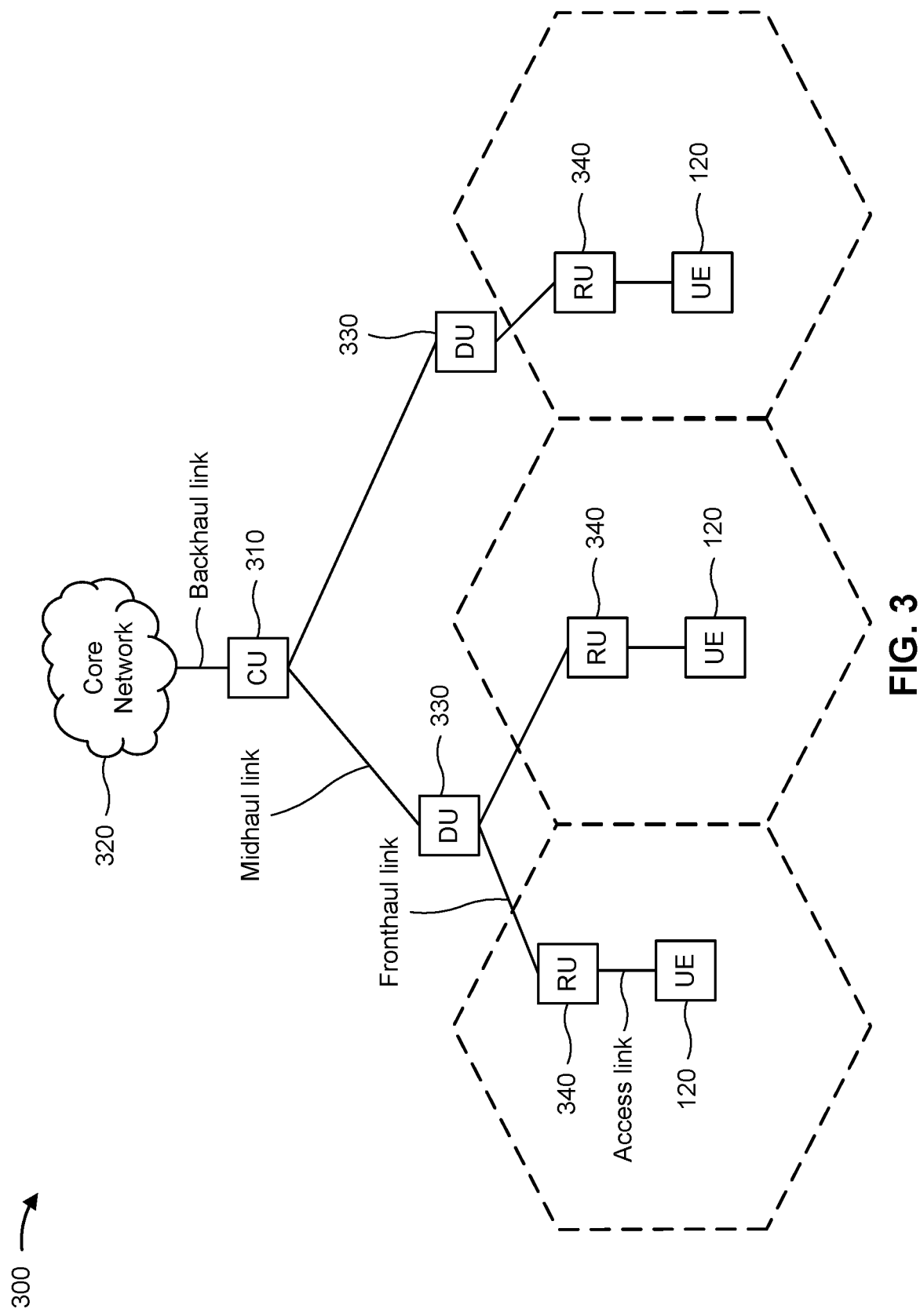
FIG. 3 is a diagram illustrating an example of an open radio access network (O-RAN) architecture, in accordance with the present disclosure.

FIG. 3 is a diagram illustrating an example 300 of an open radio access network (O-RAN) architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

A network, such as a 5G network may provide access to various services. One form of service is a multicast-broadcast (MB) service (MBS), in which data is provided via a multicast session or a broadcast session to a plurality of UEs, concurrently. For example, a broadcast service may be a communication service in which the same service and the same specific content data are provided concurrently to all UEs in a geographical area (e.g., all UEs in the broadcast coverage area that are authorized to receive the data). A multicast service may be a communication service in which the same service and the same specific content data are provided concurrently to a dedicated set of UEs (e.g., a subset of UEs in the multicast coverage that are authorized to receive the data). Another form of service is a unicast communication service, in which different data is provided via different unicast sessions to different individual UEs.

There may be benefits to implementing a broadcast-multicast service in 5G networks. For example, 5G networks may provide improved coverage, latency, reliability, or throughput, among other examples. However, challenges may arise in delivering a broadcast-multicast service in a 5G network (e.g., a 5G Multicast-Broadcast Service (5MBS), such as ambiguity in the architecture and lack of specificity regarding how such an architecture can be set up and operated. This ambiguity may lead to subpar performance of applications attempting to use broadcast-multicast services, failure of features associated with such applications, and diminished throughput.

Some techniques and apparatuses described herein enable implementation of a multicast-broadcast service using a 5G multicast-broadcast (MB) (5 MB) user service architecture (5MBS architecture or 5MBS system architecture). For example, a 5MBS architecture may include an MBSTF that is split into a multicast delivery function and a unicast server. In this case, a 5MBS client may communicate with the MBBSTF based on information received in a 5G multicast-broadcast (5 MB) user service description.

In some aspects, the 5MBS architecture may include a multicast-broadcast service (MBS)-4-multicast (MC) (MBS-4MC) interface for multicast traffic and an MBS-4-unicast (UC) (MBS-4-US) interface for unicast traffic. In this way, the 5MBS architecture allows for decomposition and independent implementation and deployment of a 5MBS client, an MBSTF multicast delivery service, and a 5MBS application server (AS) for unicast. Additionally, or alternatively, a service announcement message may include information identifying user services, NBS delivery sessions, network traffic flows, application service information (e.g., information identifying applications or libraries that a UE is to use to consume a service), or a context for data structures included in MBS delivery sessions, among other examples. In this way, a 5G MB user service enables provisioning and use of a 5MBS system by application providers via application programming interfaces (APIs) and other exposed interfaces. In some aspects, a 5G multimedia service (5GMS) may use the 5MBS architecture by interacting with the 5MBS architecture as an application, thereby enabling media transfer.

Figure 4:
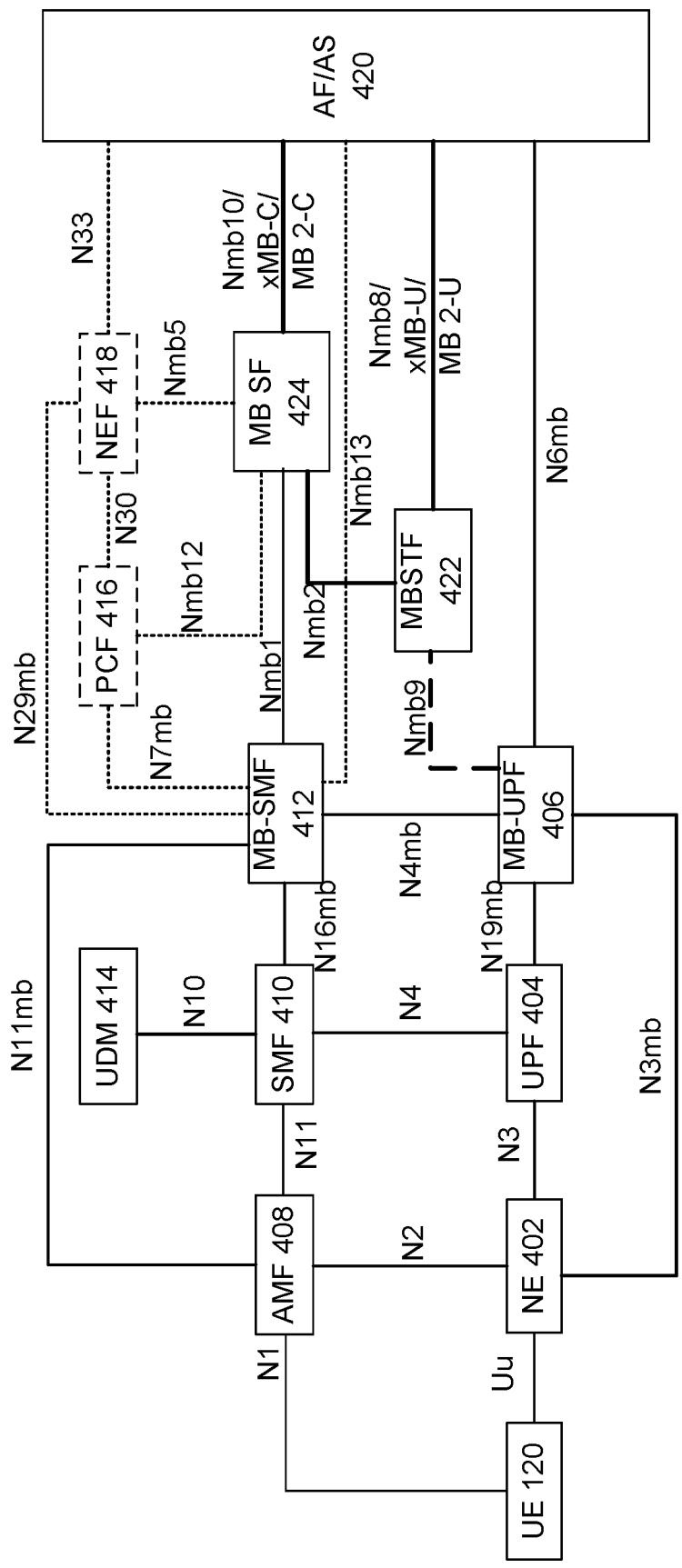
FIG. 4 is a diagram illustrating an example 5G multicast-broadcast (5MBS) system architecture, in accordance with the present disclosure.

FIG. 4 is a diagram illustrating an example 5G multicast-broadcast service (5MBS) system architecture 400, in accordance with the present disclosure.

As shown in FIG. 4, the 5MBS system architecture 400 may include a UE 120, a network entity (NE) 402, a user plane function (UPF) 404, an MB UPF (MB-UPF) 406, an application management function (AMF) 408, a service management function (SMF) 410, an MB SMF (MB-SMF) 412, a unified data management function (UDM) 414, a policy control function (PCF) 416, a network exposure function (NEF) 418, and an application function (AF) or application server (AS) (AF/AS) 420. As described in more detail herein, to provide 5MBS service, the 5MBS system architecture 400 may also include an MBSTF 422 and/or an MB service function (MB SF) 424.

The PCF 416 may support quality of service (QoS) handling, provide policy information (e.g., for authorizing QoS profiles), retrieve QoS information, or store MB service information, among other examples, for the 5MBS system architecture 400. The MB SMF 412 may support MBS session management, configure policy rules, allocate temporary mobile group identifiers (TGMIs), modify protocol data unit (PDU) sessions, establish data transmission resources, or control multicast data transport, among other examples, for the 5MBS system architecture 400. The SMF 410 may perform session discovery, perform session authorization, manage a multicast session context, or establish transmission resources, among other examples, for the 5MBS system architecture 400. The MB-UPF 406 may perform packet filtering, perform QoS enforcement, enable MB data reception, or deliver MB data, among other examples, for the 5MBS system architecture 400.

The UPF 404 may enable MB data transfer or delivery for the 5MBS system architecture 400. The AMF 408 may perform session management signaling, RAN selection, or capability signaling, among other examples, for the 5MBS system architecture 400. Network entities 402 may provide a next generation (NG) RAN (NG-RAN) that enables management of QoS flows, delivery of MBS data packets, configuration of the UE 120, control switching for the UE 120, support for multicast sessions, support for multicast session notification, or capability reporting, among other examples, for the 5MBS system architecture 400. The AF/AS 420 may request MB service, enable MBS session operation, or communicate with the NEF 418 for MBS service exposure, among other examples, for the 5MBS system architecture. The NEF 418 may provide interfaces for service provisioning, MBS session management, and QoS management, enable control of transport procedures, and select a serving MB-SMF 412, among other examples, for the 5MBS system architecture 400. A network repository function (NRF) may support management of information for the MB-SMF 412. Similarly, a unified data repository (UDR) may support management of UE authorization for the MB-SMF 412. The UDM 414 may perform subscription management and authorization for multicast sessions, and an NRF may support management of information for the MB-SMF 412.

In some aspects, the MBSF 424 may provide service level functionality to support MBS and interworking with an LTE multicast multimedia broadcast service (MBMS), enable control of transport procedures (e.g., MBS session operations, determination of transport parameters, and control of session transport), select a serving MB-SMF 412, control the MBSTF 422, enable determination of a sender internet protocol (IP) multicast address for an MBS session, among other examples, for the 5MBS system architecture 400. In some aspects, the MBSTF 422 may provide a media anchor for MBS data traffic, provide sourcing of IP multicast traffic, perform packet transport functionalities (e.g., framing, multiple flow control, or packet forward error correction (FEC) or encoding for IP multicast), perform MB delivery of input files as objects or object flows, among other examples, for the 5MBS system architecture 400.

The 5MBS system architecture 400 may include a set of interfaces, as shown. For example, as shown, 5MBS system architecture 400 may include Uu, N1, N2, N3, N4, N10, N30, or N33 interfaces. Additionally, or alternatively, the 5MBS system architecture 400 may include multicast-broadcast (MB)-specific interfaces, such as N3mb, N4mb, N6mb, N7mb, N11mb, Nmb13, N19mb, or N29mb interfaces. In some aspects, the MBSTF 422 and the MBSF 424 may be associated with another set of interfaces, such as an Nmb9 interface (e.g., between the MB-UPF 406 and the MBSTF 422), an Nmb8 interface (e.g., or an x-MB-U, MB 2-U, or MBS-2 interface between the MBSTF 422 and the AF/AS 420), an Nmb2 interface (e.g., between the MBSTF 422 and the MBSF 424, which may also be an MBS-3 interface), an Nmb1 interface (e.g., between the MB-SMF 412 and the MBSF 424), an Nmb12 interface (e.g., between the MBSF 424 and the PCF 416), an Nmb5 interface (e.g., between the NEF 418 and the MBSF 424), and/or an Nmb10 interface (e.g., or an xMB-C, MB 2-C, or MBS-1 interface between the MBSF 424 and the AF/AS 420). In some aspects, the MBSF 424 is omitted from the 5MBS system architecture 400 or co-located with the NEF 418 of the 5MBS system architecture 400. In some aspects, some interfaces of the 5MBS system architecture 400 may be provided to support legacy application services. For example, the xMB-C interface, the MB2-C interface, the xMB-U interface, or the MB2-UE interface, among other examples, may provide support for legacy (e.g., reduced capability) UEs 120.

As indicated above, FIG. 4 is provided as an example. Other examples may differ from what is described with respect to FIG. 4.

Figure 5:
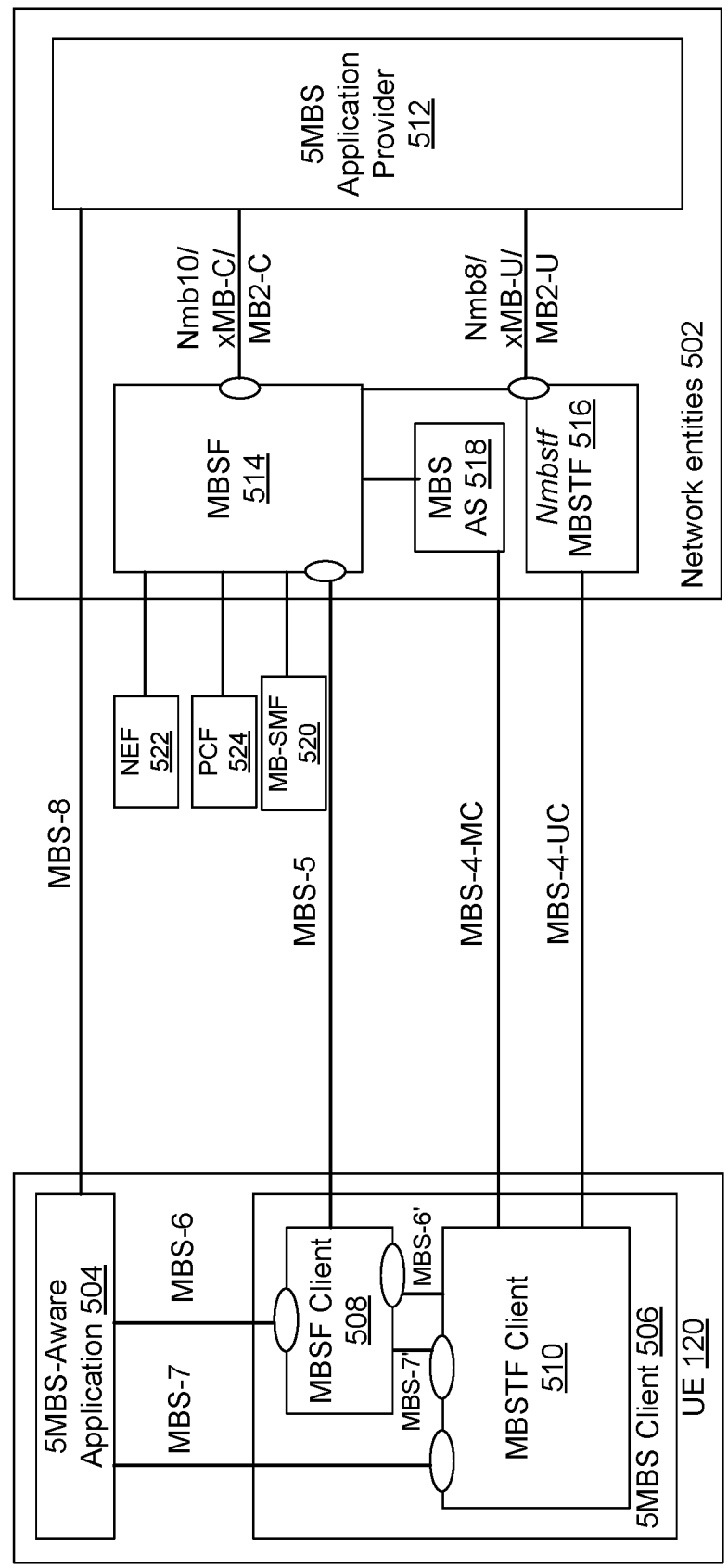
FIG. 5 is a diagram illustrating an example 5MBS user service architecture, in accordance with the present disclosure.

FIG. 5 is a diagram illustrating an example 5MBS user service architecture 500, in accordance with the present disclosure.

As shown in FIG. 5, the 5MBS user service architecture 500 may include a UE 120 and set of network entities 502. UE 120 may include a 5MBS-aware application 504 and a 5MBS client 506, which includes an MBSF client 508 and an MBSTF client 510. Network entities 502 may include a 5MBS application provider 512, an MBSF 514, and an MBSTF 516, which may include an Nmb service transport function (Nmbstf) service, an MBS application server (AS) 518, and an MB-SMF 520. In some implementations, network entities 502 may include a multimedia content (MC) delivery component and a 5MBS AS (which may be the MBS AS 518). Additionally, or alternatively, 5MBS user service architecture 500 may include an NEF 522, a PCF 524, and the MB-SMF 520.

As further shown in FIG. 5, 5MBS user service architecture 500 may include a set of interfaces or reference points, such as an MBS-7 reference point, an MBS-6 reference point, an MBS-7' reference point, an MBS-6' reference point, an MBS-5 reference point, an MBS-4-MC reference point, an MBS4-UC reference point, an MBBS-8 reference point, an N33 reference point, an Nmb5 reference point, an Nmb2 reference point, an Nmb10 (or xMB-C or MB2-C) reference point, and/or an Nmb8 (or xMB-U or MB2-U) reference point. Additionally, or alternatively, components of the 5MBS user service architecture 500 may expose application programming interfaces (APIs) on some of the interfaces, as shown.

In some aspects, MBS-5 may include an interface or reference point associated with an API for communication between a 5MBS client 506 and MBSF 514. In some aspects, MBS-5 may provide 5MBS control plane and service handling associated with a user service description, as described in more detail with regard to 3GPP Technical Specification (TS) 26.346, Release 16 (Rel. 16), version 16.9.1.

MBS-4-MC may include an interface or reference point associated with unidirectional and multicast delivery from MBSTF 516 to 5MBS client 506. MBS-4-UC may include an interface for unicast delivery from MBSTF 516 to 5MBS client 506. MBS-6 may include an API-based interface or reference point exposed by 5MBS client 506 and used by 5MBS-aware application 504 to manage and control 5MBS services. MBS-7 may include an API-based interface or reference point exposed by 5MBS client 506 and used by 5MBS-aware application 504 to receive user data information associated with 5MBS services. MBS-8 may include an interface or reference point between 5MBS application provider 512 and 5MBS-aware application 504 for announcing 5 MB user services.

As indicated above, FIG. 5 is provided as an example. Other examples may differ from what is described with respect to FIG. 5.

Figure 6:
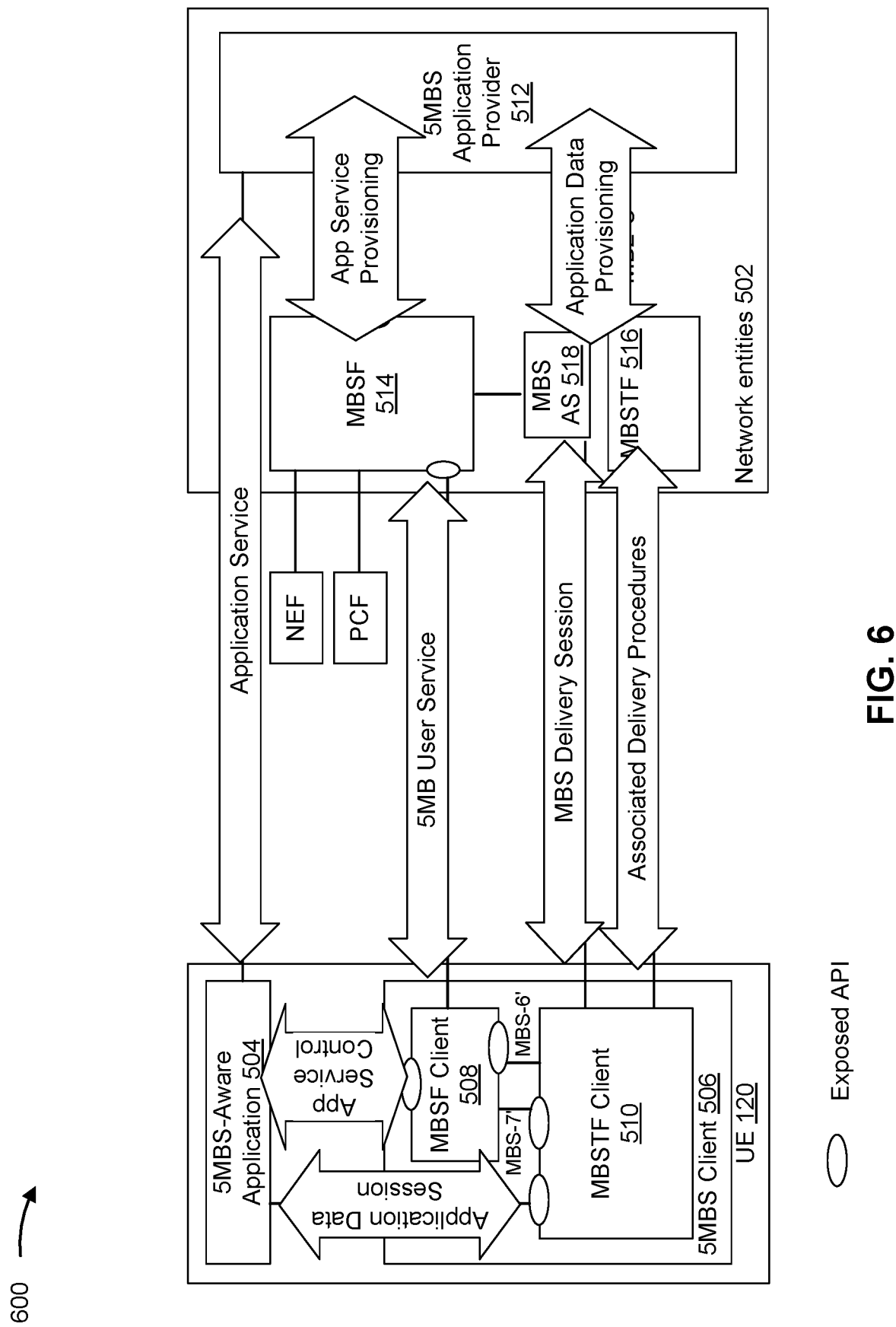
FIG. 6 is a diagram illustrating an example of sessions and services using a 5MBS user service architecture, in accordance with the present disclosure.

FIG. 6 is a diagram illustrating an example 600 of sessions and services using the 5MBS user service architecture 500, in accordance with the present disclosure.

As shown in FIG. 6, within the UE 120, an application service control is provided on an interface between 5MBS-aware application 504 and MBSF client 508, of 5MBS client 506. Additionally, or alternatively, an application data session is provided on an interface between 5MBS-aware application 504 and MBSTF client 510. As further shown in FIG. 6, an application service is provided between 5MBS-aware application 504 of UE 120 and 5MBS application provider 512 of network entities 502. The application service may include an end-user service for which data (or parts thereof) of the end-user service is accessible by joining a 5 MB user service. The 5 MB user service may include a transport-level service using an MBS delivery session to deliver an application service. The MBS delivery session may be associated with parameters such as a time parameter, a protocol parameter, or a protocol state parameter. For example, the MBS delivery session may have a set of parameters that identify a sender and receiver configuration, and the MBS delivery session may use an MBS session for delivery of an application data session. In this case, the application data session is associated with a set of parameters provided by a 5MBS application provider for delivery over the 5MBS user service architecture 500.

Similarly, 5MBS user service is provided between MBSF client 508 and MBSF 514, an MBS delivery session is established between MBSTF client 510 and MC delivery component 518, and a set of associated delivery procedures are provided as sessions or services between MBSTF client 510 and MBS application server 518 or the MBSTF 516. As further shown in FIG. 6, within network entities 502, an application service provisioning session is provided between MBSF 514 and 5MBS application provider 512. Similarly, an application data provisioning session is provided between MC delivery component 518 and 5MBS application provider 512.

As indicated above, FIG. 6 is provided as an example. Other examples may differ from what is described with respect to FIG. 6.

Figure 7:
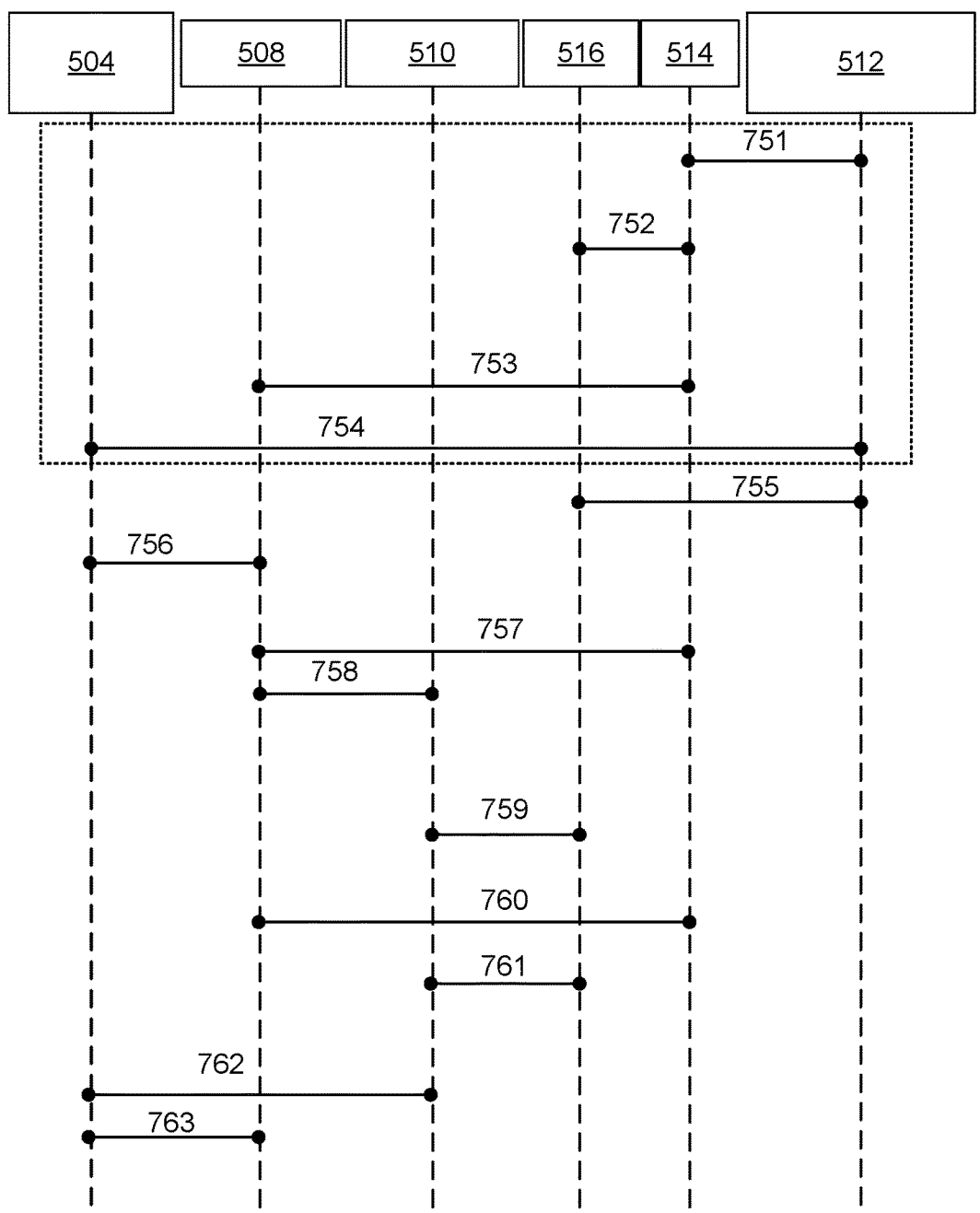
FIG. 7 is a diagram illustrating an example of session and service procedures using the 5MBS user service architecture, in accordance with the present disclosure.

FIG. 7 is a diagram illustrating an example 700 of session and service procedures using the 5MBS user service architecture 500, in accordance with the present disclosure. In some aspects, the 5MBS user service architecture 500 may be associated with a user service bundle that includes a plurality of 5MBS user services (e.g., each of which may be associated with a plurality of MBS delivery sessions such that, at a particular time, only a single MBS delivery session is active and/or exists). In some aspects, the user service bundle is associated with a user service description (e.g., a 5G MB user service), which can be set by MBSF 514 and provided to 5MBS client 506, as described herein.

In some aspects, an MBS session description can be used to map MBS delivery sessions to flows, which may be used to distribute data (e.g., by mapping to 5MBS delivery parameters). Accordingly, a hierarchy can include a service bundle, which includes a set of S user services, each of which include a set of MMBS delivery sessions, each of which is associated with a set of F flows. In other words, each delivery session can include a plurality of flows and each delivery session can deliver data provided by an application data session of a common 5MBS application provider 512. Reporting for the service bundle can include session reporting and/or service reporting, in some aspects. Accordingly, in some aspects, a data structure can include a user service bundle description, which includes user service bundle parameters and user services S (e.g., which includes user service parameters and MBS delivery sessions M). Further, in the data structure, a user service may include an indication of an application service (e.g., with application service parameters), a schedule, or a service reporting parameter, among other examples. The application service may be associated with one or more applications or libraries that are to be on UE 120 to enable UE 120 to use a service, such as a hypertext transfer protocol (HTTP) live streaming (HLS) application service indicating that the UE 120 is to have access to an HLS client. In this case, the application service indication may provide context to the UE 120 regarding one or more other data structures that are to be included in an MBS delivery session, as described below.

In the data structure, an MBS delivery session may be associated with delivery session parameters (identifier parameters and type parameters) and flows F (which may have parameters, such as an identifier, a configuration, or an FEC parameter). Further, in the data structure, an MBS delivery session may be associated with a unicast alternative or a session reporting parameter. In some aspects, the data structure may permit distribution of a service announcement (e.g., a 5 MB user service announcement, as described herein) via a dedicated MBS user service (e.g., a particular multicast addressed), externally, via a unicast transmission, or in-band (internally), via a user session.

In a first operation 751, the 5MBS application provider 512 may communicate with MBSF 514 for application service provisioning. For example, the 5MBS application provider 512 may communicate with the MBSF 514 on the Nmb10 interface.

In a second operation 752, the MBSF 514 may communicate with the MBSTF 516 for delivery service provisioning. For example, the MBSF 514 may communicate with the MBSTF 516 on the Nmb2 interface.

In a third operation 753, the MBSF 514 may communicate with the MBSF client 508 for 5 MB user service announcement. For example, the MBSF 514 may communicate with the MBSF client 508 on the MBS-5 interface. In some aspects, the 5 MB user service announcement provides the UE 120 with descriptions that identify multicast or broadcast services that can be delivered in connection with an MBS session. For example, the 5 MB user service announcement may include an MBS session identifier (e.g., a TGMI or source specific IP multicast address) for a service that the UE 120 can access. In some aspects, the 5 MB user service announcement may include a public land mobile network (PLMN) identifier of a PLMN in which the service is to be delivered.

In a fourth operation 754, the 5MBS application provider 512 may communicate with the 5MBS-aware application 504 for application service announcement. For example, the 5MBS application provider 512 may communicate with the 5MBS-aware application 504 on the MBS-8 interface.

In a fifth operation 755, the 5MBS application provider 512 may communicate with the MBSTF 516 for application data session ingestion. For example, the 5MBS application provider 512 may communicate with the MBSTF 516 on the Nmb8 interface.

In a sixth operation 756, the 5MBS-aware application 504 may communicate with the MBSF client 508 for an application service request. For example, the 5MBS-aware application 504 may communicate with the MBSF client 508 on the MBS-6 interface.

In a seventh operation 757, the MBSF client 508 may communicate with the MBSF 514 for 5 MB user service discovery. For example, the MBSF client 508 may communicate with the MBSF 514 on the MBS-5 interface.

In an eighth operation 758, the MBSF client 508 may communicate with the MBSTF client 510 for providing MBS delivery session information. For example, the MBSF client 508 may communicate with the MBSTF client 510 on the MBS-6' interface. In some aspects, an MBS session identifier may identify an MBS session through a 5G system transport on external interfaces toward, for example, the AF/AS 420. For example, the MBS session identifier may include a TGMI (e.g., for an MBS broadcast session and/or an MBS multicast session) or a source specific IP multicast address (e.g., for an MBS multicast session). Additionally, or alternatively, when an MBS multicast session is associated with a standalone non-public network (SNPN) identifier, components of the 5MBS user service architecture 500 can identify the MBS multicast session using a source specific IP multicast address or a TGMI. Additional details regarding service identification are described with regard to 3GPP Technical Specification (TS) 23.003, Release 17, Version 17.5.0.

In a ninth operation 759, the MBSTF client 510 may communicate with MBSTF 516 for session joining. For example, the MBSTF client 510 may communicate with the MBSTF 516 on the MBS-4 interface.

In a tenth operation 760, the MBSF client 508 may communicate with the MBSF 514 for MBS delivery session handling. For example, the MBSF client 508 may communicate with the MBSF 514 on the MBS-5 interface.

In an eleventh operation 761, the MBSTF client 510 may communicate with the MBSTF 516 for an MBS delivery session. For example, the MBSTF client 510 may communicate with the MBSTF 516 on the MBS-4 interface.

In a twelfth operation 762, the 5MBS-aware application 504 may communicate with the MBSTF client 510 for an application data session. For example, the 5MBS-aware application 504 may communicate with the MBSTF client 510 on the MBS-7 interface.

In a thirteenth operation 763, the 5MBS-aware application 504 may communicate with the MBSF client 508 for application service control. For example, 5MBS-aware application 504 may communicate with the MBSF client 508 on the MBS-6 interface.

As indicated above, FIG. 7 is provided as an example. Other examples may differ from what is described with respect to FIG. 7.

Figure 8:
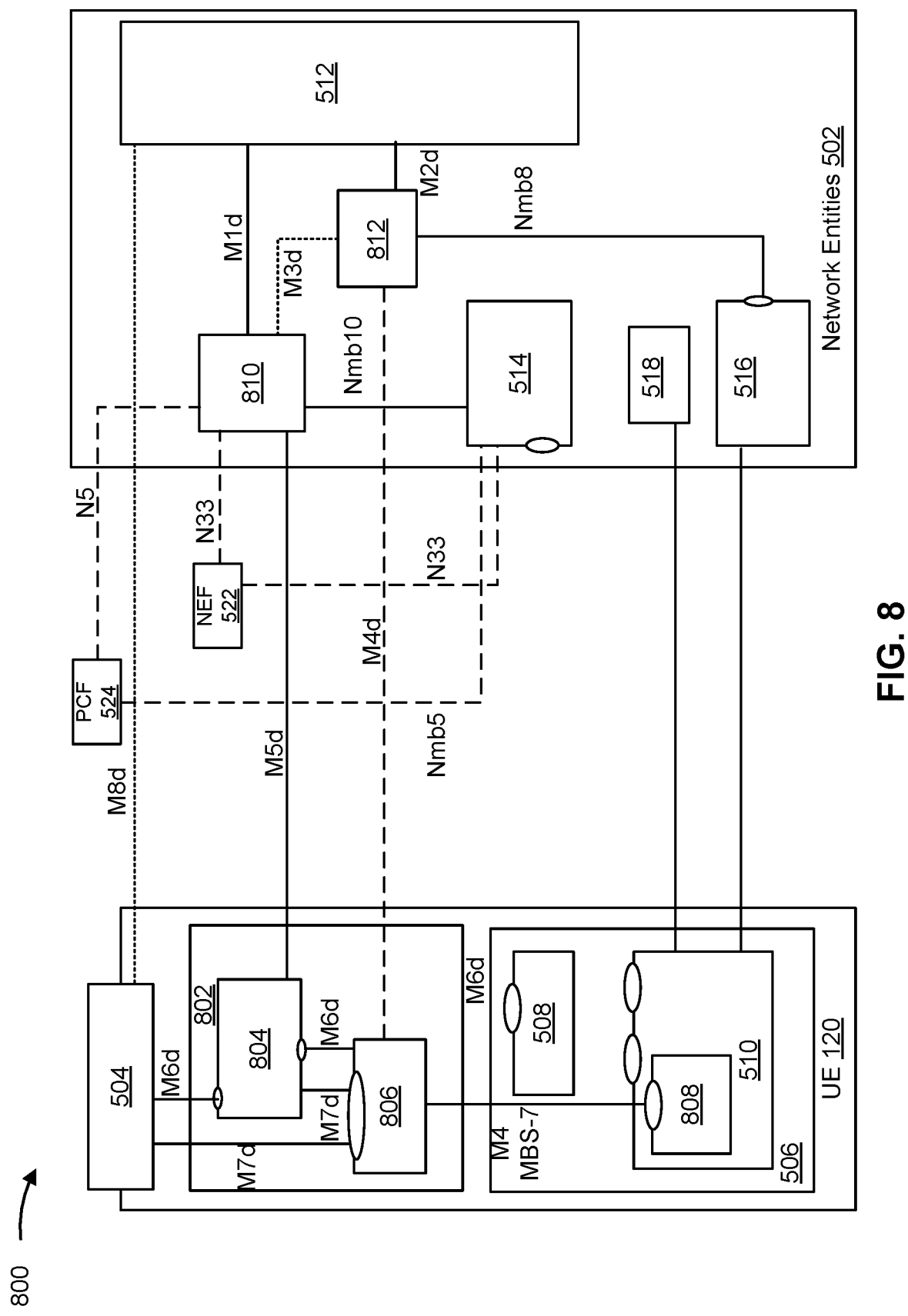
FIG. 8 is a diagram illustrating an example associated with a user service architecture, in accordance with the present disclosure.

FIG. 8 is a diagram illustrating a user service architecture 800, in accordance with the present disclosure. As shown in FIG. 8, the user service architecture 800 may include UE 120 and one or more network entities 502. As described above with regard to FIG. 5 and the 5MBS user service architecture 500, the user service architecture 800 may include, in UE 120, components 504, 506, 508, and 510 and, in network entities 502, components 512, 514, 516, 518, and 520, as well as a PCF 524 and an NEF 522.

As further shown in FIG. 8, user service architecture 800 may include a 5G media streaming via a 5MBS (5GMS or 5GMSd) client 802, which includes a media session handler 804, a media player 806, and a 5GMSd application server (AS) 808. Media session handler 804 may communicate with media player 806 using an M7d interface and an M6d interface, may communicate with a 5GMSd application function (AF) 810 of network entities 502 via an M5d interface, and may communicate with 5MBS-aware application 504 (which may be a 5MBSd-aware application) via an M6d interface. Similarly, the media player 806 may communicate with the 5MBS-aware application 504 via an M7d interface and may communicate with the 5GMSd AS 808 via an M4 interface and/or the MBS-7 interface. The 5GMSd AF 810 may communicate with the PCF via an N5 interface, with the NEF 522 via an N33 interface, with the MBSF 514 via an Nmb10 (or xMB-C or MB2-C) interface, with a 5GMSd AS 812 via an M3d interface, and with the 5MBS application provider 512 (which may be a 5GMSd application provider) via an M2d interface. 5GMSd AS 812 may communicate with the MBSTF 516 via an Nmb8 (or xMB-U or MB2-U) interface and with 5MBS application provider 512 via an M2d interface.

In some aspects, the MBSTF 516 may be an MBS entity that is split into a multicast delivery function and a unicast application server in the user service architecture 800. In this case, as described above, the 5MBS client 506 (e.g., which includes the MBSTF 516) may communicate with the MBSTF 516 based on information obtained in a 5 MB user service description, as described in more detail herein (e.g., using the MBS-4-MC interface for multicast traffic or the MBS-4-UC interface for unicast traffic). In this way, the 5MBS client 506 can be deployed for multicast delivery with the MBSTF 516 and unicast delivery using communication with the 5MBS AS 518 of network entity 502. Although some interfaces and components are described herein, other interfaces and components, such as other interfaces and components described elsewhere herein, may also be present in the user service architecture 800.

As indicated above, FIG. 8 is provided as an example. Other examples may differ from what is described with respect to FIG. 8.

Figure 9:
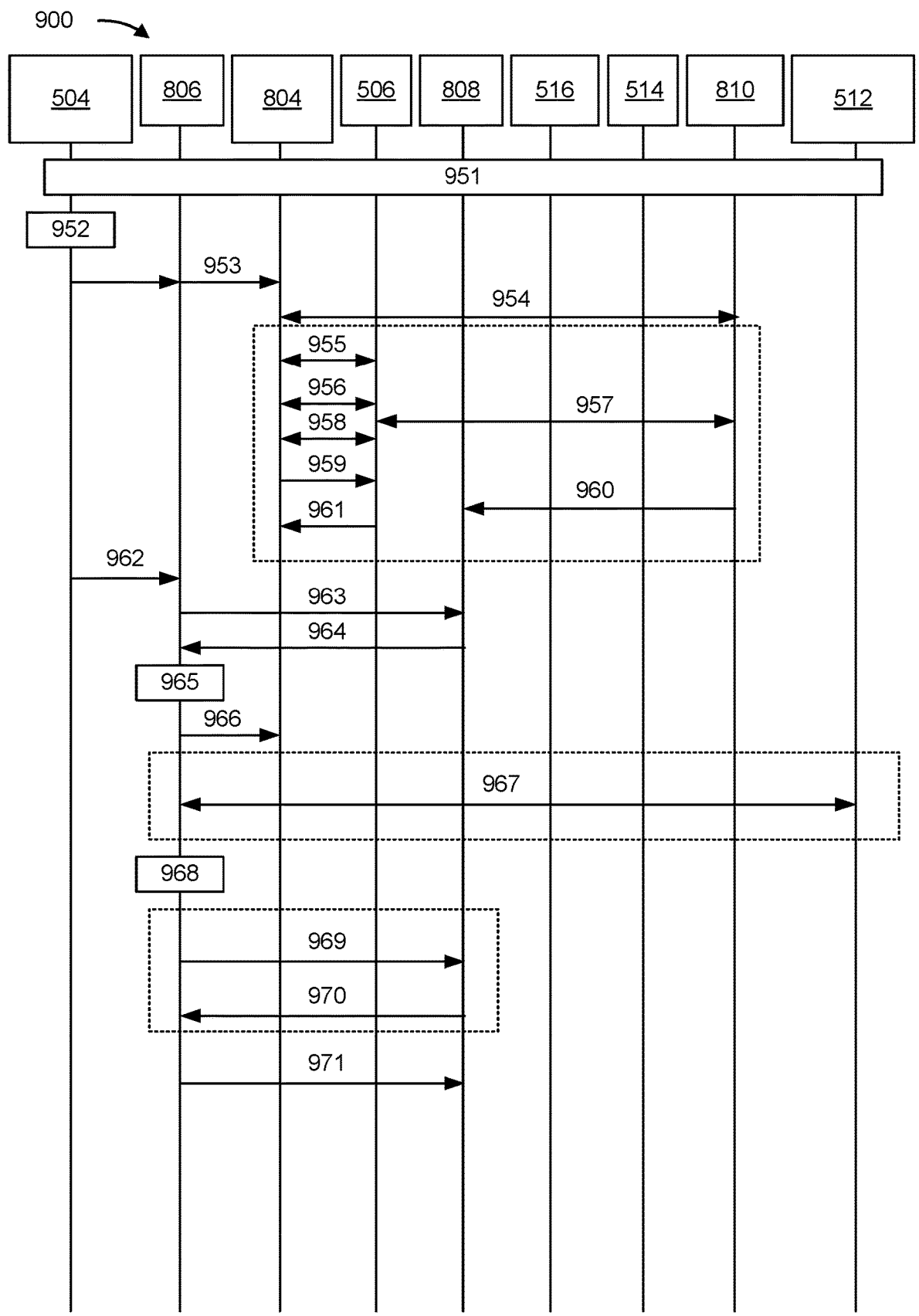
FIG. 9 is a diagram illustrating an example associated with session and service procedures using the user service architecture, in accordance with the present disclosure.

FIG. 9 is a diagram illustrating an example 900 of session and service procedures using the user service architecture 800, in accordance with the present disclosure. In some aspects, operations 951 through 970 may occur based at least in part on the 5GMSd AF 810 provisioning a 5G media streaming system and setting up content ingestion for the 5G media streaming system, the ingested content being forwarded to the MBSTF 516 using the M1d interface, and/or the 5MBS-aware application 504 (e.g., which may be a 5GMSd-aware application) receiving a service announcement from a 5GMS application provider, among other examples.

In a first operation 951, components of the user service architecture 800 communicate for service announcement and content discovery, as described above. For example, the 5MBS-aware application 504 may trigger a service announcement and service and content discovery procedure with an external application server. In some aspects, a service announcement includes a service access information element (e.g., which includes media session handling (M5d) parameters and/or media streaming access (M4d) parameters) or a reference thereto.

In a second operation 952, the 5MBS-aware application 504 selects media content. For example, the 5MBS-aware application 504 selects a media content item for streaming.

In a third operation 953, the 5MBS-aware application 504 communicates with the media session handler 804 to initiate media playback. For example, the 5MBS-aware application 504 triggers the media session handler 804 (and/or a 5GMSd client associated therewith) to start media playback. In some aspects, the 5GMSd client associated with the media session handler 804 may receive information associated with a media player entry to enable initiation of media playback.

In a fourth operation 954, the media session handler 804 communicates with the 5GMSd AF 810 to acquire service access information. For example, when the 5MBS-aware application 504 has received only a reference to the service access information (e.g., rather than the service access information element, itself, as described above), the media session handler 804 interacts with the 5GMSd AF 810 to acquire the service access information (e.g., using the reference to the service access information).

In a fifth operation 955 through an eleventh operation 961, media session handler 804, 5MBS client 506, 5GMSd AS 808, MBSTF 516, and MBSF 514 communicate to start streaming service and initiate service acquisition. Additional details regarding service acquisition are described with regard to 3GPP TS 26.347, Release 17, version 17.0.0. As an example, the media session handler 804 may register a streaming application (955) with and receiving a streaming application registration response (956) from 5MBS client 506. Additionally, or alternatively, the 5MBS client 506 may communicate with the MBSF 514 for 5 MB user service discovery (957). Additionally, or alternatively, the media session handler 804 and the 5MBS client 506 communicate to get and start a streaming service (958 and 959). Additionally, or alternatively, the MBSF 514 pushes objects and a media presentation description file (MPD) to the 5GMSd AS 808 (960). Additionally, or alternatively, the 5MBS client 506 communicates with the media session handler 804 to indicate that the streaming service is started (961). In this way, a transport session for MPD and content is established.

In a twelfth operation 962, the 5MBS-aware application 504 starts media playback with the media player 806. For example, concurrent with one or more of operations 955 through 966, the media player 806 is invoked to start media access and playback.

In a thirteenth operation 963 and a fourteenth operation 964, the media player 806 communicates with 5GMSd AS 808 to request the MPD and receive a response confirming the MPD. In a fifteenth operation 965, the media player 806 processes the MPD. In a sixteenth operation 966, the media player 806 indicates receipt of the MPD to media session handler 804. For example, the media player 806 indicates one or more parameters, from the MPD, to the media session handler 804. In this way, the media player 806 acquires the MPD for playback.

In a seventeenth operation 967, the media player 806 communicates with the 5MBS application provider 512 to acquire digital rights management (DRM) information. For example, the media player 806 may acquire a DRM license for media playback.

In an eighteenth operation 968 and a nineteenth operation 969, the media player 806 communicates with the 5GMSd AS 808 to request initialization information and to receive the initialization information. For example, the media player 806 may request and receive initialization information associated with acquiring media segments for playback.

In a twentieth operation 970 and a twenty-first operation 971, the media player 806 communicates with the 5GMSd AS 808 to request media segments in accordance with the MPD and receive media content as a response. For example, the media player 806 requests and receives segments of the media content and can playback the segments of the media content. In this way, 5GMS service is provided on top of 5MBS.

As indicated above, FIG. 9 is provided as an example. Other examples may differ from what is described with respect to FIG. 9.

Figure 10:
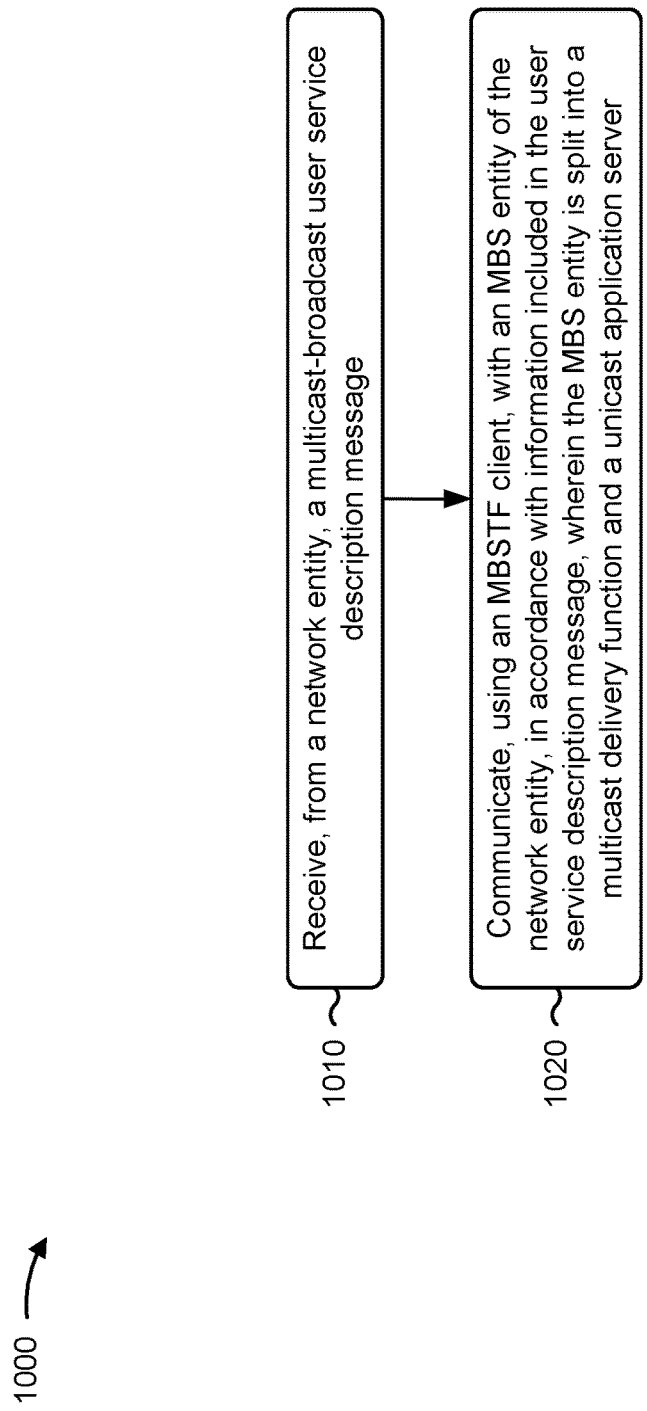
FIGS. 10-11 are diagrams illustrating example processes associated with a multicast-broadcast user service architecture, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with a multicast-broadcast user service architecture.

As shown in FIG. 10, in some aspects, process 1000 may include receiving, from a network entity, a multicast-broadcast user service description message (block 1010). For example, the UE (e.g., using communication manager 140 and/or reception component 1202, depicted in FIG. 12) may receive, from a network entity, a multicast-broadcast user service description message, as described above.

As further shown in FIG. 10, in some aspects, process 1000 may include communicating, using an MBSTF client, with an MBS entity of the network entity, in accordance with information included in the user service description message, wherein the MBS entity is split into a multicast delivery function and a unicast application server (block 1020). For example, the UE (e.g., using communication manager 140 and/or reception component 1202 or transmission component 1204, depicted in FIG. 12) may communicate, using an MBSTF client, with an MBS entity of the network entity, in accordance with information included in the user service description message, wherein the MBS entity is split into a multicast delivery function and a unicast application server, as described above. In some aspects, the MBS entity is split into a multicast delivery function, such as an MBSTF, and a unicast application server, such as an MBS AS.

Process 1000 may include additional aspects, such as any single aspect or any combination of aspects described below and/or in connection with one or more other processes described elsewhere herein.

In a first aspect, the user service description is a 5G multicast-broadcast user service description.

In a second aspect, alone or in combination with the first aspect, the MBS entity and the MBSTF client communicate via a multicast-broadcast service-4-multicast (MBS-4-MC) interface for multicast traffic associated with the multicast delivery function and a multicast-broadcast service-4-unicast (MBS-4-UC) interface for unicast traffic associated with the unicast application server.

In a third aspect, alone or in combination with one or more of the first and second aspects, process 1000 includes receiving, by a multicast-broadcast service function (MBSF) client of the UE, a multicast-broadcast user service announcement from an MBSF entity of the network entity, and establishing a multicast-broadcast user service based at least in part on the multicast-broadcast user service announcement.

In a fourth aspect, alone or in combination with one or more of the first through third aspects, the multicast-broadcast user service is established based at least in part on an instruction from the MBS entity or the MBSTF client.

In a fifth aspect, alone or in combination with one or more of the first through fourth aspects, the multicast-broadcast user service includes one or more delivery sessions, and a delivery session, of the one or more delivery sessions, includes one or more traffic flows.

In a sixth aspect, alone or in combination with one or more of the first through fifth aspects, the delivery session is associated with transfer of traffic associated with an application data session associated with a multicast-broadcast application provider.

In a seventh aspect, alone or in combination with one or more of the first through sixth aspects, the UE includes a multicast-broadcast service client associated with providing a service to a multicast-broadcast aware application via at least one call to an application programming interface.

In an eighth aspect, alone or in combination with one or more of the first through seventh aspects, the multicast-broadcast user service announcement comprises a user service description bundle including one or more user services, wherein each user service, of the one or more user services, includes one or more multicast-broadcast delivery sessions mapped to one or more multicast broadcast sessions associated with a core network.

In a ninth aspect, alone or in combination with one or more of the first through eighth aspects, the multicast-broadcast user service announcement includes an application service information message, wherein the application service information message identifies one or more applications or libraries associated with a service.

In a tenth aspect, alone or in combination with one or more of the first through ninth aspects, a multicast-broadcast service (MBS) client of the UE includes the MBSF client and the MBSTF client.

In an eleventh aspect, alone or in combination with one or more of the first through tenth aspects, traffic associated with a multimedia streaming service is transferred in association with a multicast-broadcast service associated with the MBSF client, wherein the MBSF client includes an application server function.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
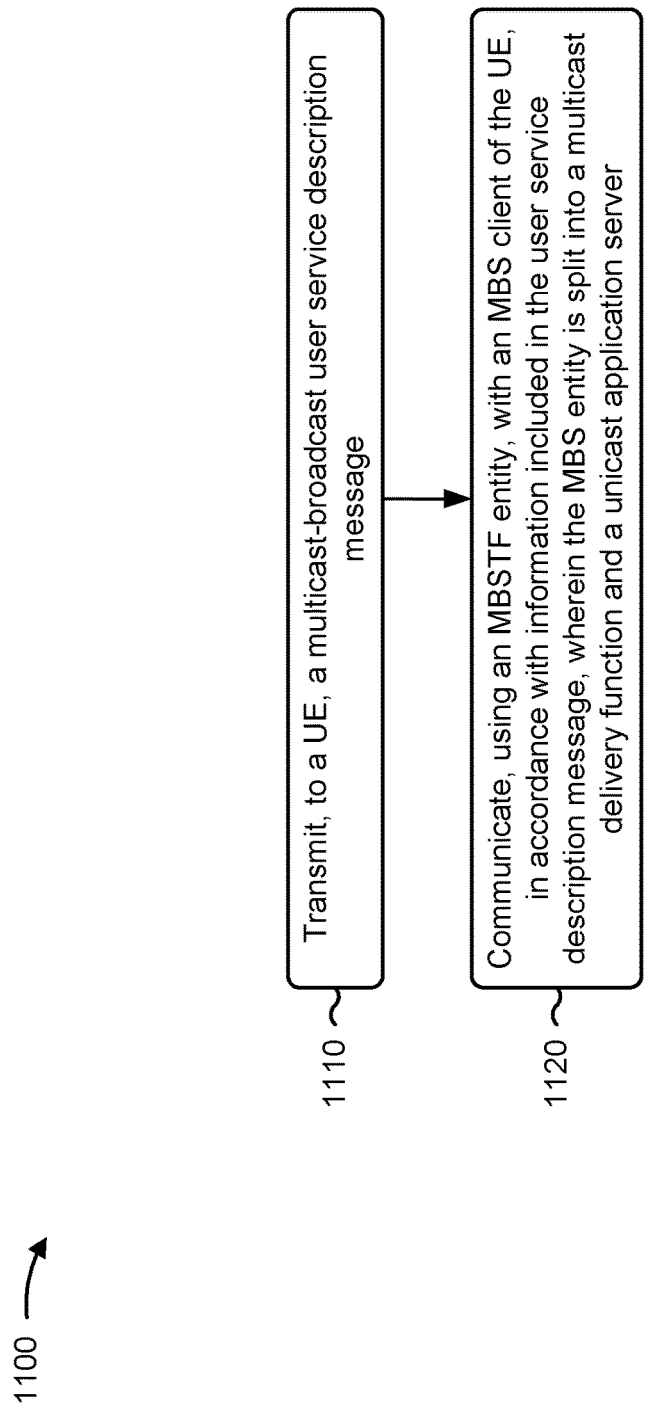

FIG. 11 is a diagram illustrating an example process 1100 performed, for example, by a network entity, in accordance with the present disclosure. Example process 1100 is an example where the network entity (e.g., base station 110, RU 340, DU 330, or CU 310, a core network device of core network 320, or a network entity 502, among other examples) performs operations associated with a multicast-broadcast user service architecture.

As shown in FIG. 11, in some aspects, process 1100 may include transmitting, to a UE, a multicast-broadcast user service description message (block 1110). For example, the network entity (e.g., using communication manager 150 and/or transmission component 1304, depicted in FIG. 13) may transmit, to a UE, a multicast-broadcast user service description message, as described above.

As further shown in FIG. 11, in some aspects, process 1100 may include communicating, using an MBS entity, with an MBSTF client of the UE, in accordance with information included in the user service description message, wherein the MBS entity is split into a multicast delivery function and a unicast application server (block 1120). For example, the network entity (e.g., using communication manager 150 and/or reception component 1302 or transmission component 1304, depicted in FIG. 13) may communicate, using an MBS entity, with an MBSTF client of the UE, in accordance with information included in the user service description message, wherein the MBS entity is split into a multicast delivery function and a unicast application server, as described above.

Process 1100 may include additional aspects, such as any single aspect or any combination of aspects described below and/or in connection with one or more other processes described elsewhere herein.

In a first aspect, the user service description is a 5G multicast-broadcast user service description.

In a second aspect, alone or in combination with the first aspect, the MBS entity and the MBSTF client communicate via an MBS-4-MC interface for multicast traffic associated with the multicast delivery function and an MBS-4-UC interface for unicast traffic associated with the unicast application server.

In a third aspect, alone or in combination with one or more of the first and second aspects, process 1100 includes transmitting, to an MBSF client of the UE and from an MBSF entity of the network entity, a multicast-broadcast user service announcement, and establishing a multicast-broadcast user service based at least in part on the multicast-broadcast user service announcement.

In a fourth aspect, alone or in combination with one or more of the first through third aspects, the multicast-broadcast user service is established based at least in part on an instruction from the MBS entity or the MBSTF client.

In a fifth aspect, alone or in combination with one or more of the first through fourth aspects, the multicast-broadcast user service includes one or more delivery sessions, and a delivery session, of the one or more delivery sessions, includes one or more traffic flows.

In a sixth aspect, alone or in combination with one or more of the first through fifth aspects, the delivery session is associated with transfer of traffic associated with an application data session associated with a multicast-broadcast application provider.

In a seventh aspect, alone or in combination with one or more of the first through sixth aspects, the UE includes an MBS client associated with providing a service to a multicast-broadcast aware application via at least one call to an application programming interface.

In an eighth aspect, alone or in combination with one or more of the first through seventh aspects, the multicast-broadcast user service announcement comprises a user service description bundle including one or more user services, wherein each user service, of the one or more user services, includes one or more multicast-broadcast delivery sessions mapped to one or more multicast broadcast sessions associated with a core network.

In a ninth aspect, alone or in combination with one or more of the first through eighth aspects, the multicast-broadcast user service announcement includes an application service information message, wherein the application service information message identifies one or more applications or libraries associated with a service.

In a tenth aspect, alone or in combination with one or more of the first through ninth aspects, an MBS client of the UE includes the MBSF client and the MBSTF client.

In an eleventh aspect, alone or in combination with one or more of the first through tenth aspects, traffic associated with a multimedia streaming service is transferred in association with a multicast-broadcast service associated with the MBSF client, wherein the MBSF client includes an application server function.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
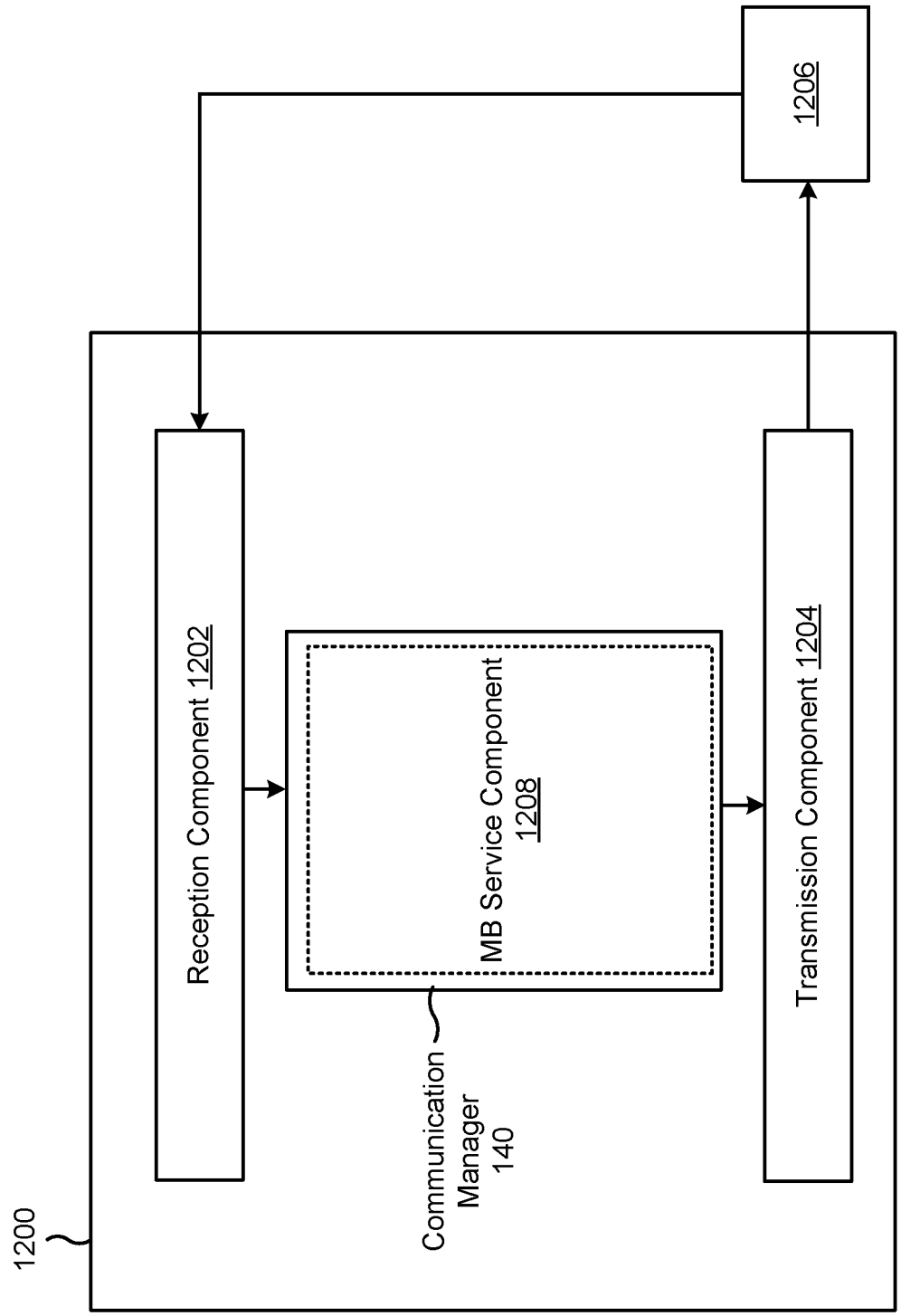
FIGS. 12-13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, a network device, a 5G system, a core network, or another wireless communication device) using the reception component 1202 and the transmission component 1204. As further shown, the apparatus 1200 may include the communication manager 140. The communication manager 140 may include one or more of a multicast-broadcast (MB) service component 1208 among other examples.

In some aspects, the apparatus 1200 may be configured to perform one or more operations described herein. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a network entity, a multicast-broadcast user service description message. The MB service component 1208 may use reception component 1202 and/or transmission component 1204 to communicate, using a multicast-broadcast service (NMBS) transport function (MBSTF) client, with an MBS entity of the network entity, in accordance with information included in the user service description message, wherein the MBS entity is split into a multicast delivery function and a unicast application server. The reception component 1202 may receive a multicast-broadcast user service announcement from an MBSF entity of the network entity. The MB service component 1208 may establish a multicast-broadcast user service based at least in part on the multicast-broadcast user service announcement. The MB service component 1208 may include one or more clients described herein.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
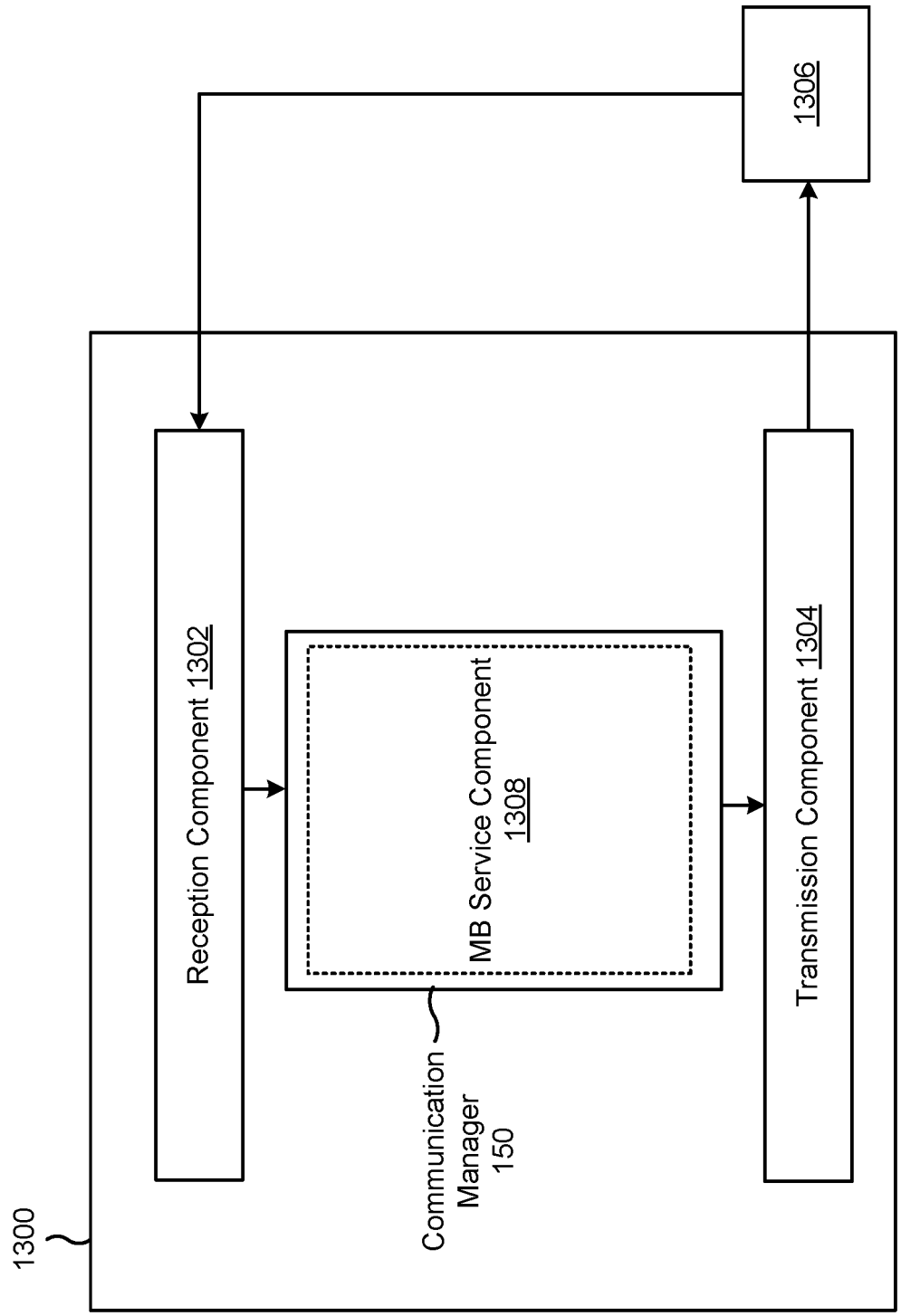

FIG. 13 is a diagram of an example apparatus 1300 for wireless communication. The apparatus 1300 may be a network entity, or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include one or more of an MB service component 1308, among other examples.

In some aspects, the apparatus 1300 may be configured to perform one or more operations described herein. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The transmission component 1304 may transmit, to a UE, a multicast-broadcast user service description message. The MB service component 1308 may use reception component 1302 and/or transmission component 1304 to communicate, using an MBS entity, with an MBSTF client of the UE, in accordance with information included in the user service description message, wherein the MBS entity is split into a multicast delivery function and a unicast application server. The transmission component 1304 may transmit, to an MBSF client of the UE and from an MBSF entity of the network entity, a multicast-broadcast user service announcement. The MB service component 1308 may establish a multicast-broadcast user service based at least in part on the multicast-broadcast user service announcement. The MB service component 1308 may include one or more entities described herein.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a network entity, a multicast-broadcast user service description message; and communicating, using a multicast-broadcast service (MBS) transport function (MBSTF) client, with an MBS entity of the network entity, in accordance with information included in the user service description message, wherein the MBS entity is split into a multicast delivery function and a unicast application server.

Aspect 2: The method of Aspect 1, wherein the user service description is a 5G multicast-broadcast user service description.

Aspect 3: The method of any of Aspects 1 to 3, wherein the MBS entity and the MBSTF client communicate via a multicast-broadcast service-4-multicast (MBS-4-MC) interface for multicast traffic associated with the multicast delivery function and a multicast-broadcast service-4-unicast (MBS-4-UC) interface for unicast traffic associated with the unicast application server.

Aspect 4: The method of any of Aspects 1 to 4, further comprising: receiving, by a multicast-broadcast service function (MBSF) client of the UE, a multicast-broadcast user service announcement from an MBSF entity of the network entity; and establishing a multicast-broadcast user service based at least in part on the multicast-broadcast user service announcement.

Aspect 5: The method of Aspect 4, wherein the multicast-broadcast user service is established based at least in part on an instruction from the NBS entity or the MBSTF client.

Aspect 6: The method of any of Aspects 4 to 5, wherein the multicast-broadcast user service includes one or more delivery sessions, and wherein a delivery session, of the one or more delivery sessions, includes one or more traffic flows.

Aspect 7: The method of Aspect 6, wherein the delivery session is associated with transfer of traffic associated with an application data session associated with a multicast-broadcast application provider.

Aspect 8: The method of any of Aspects 6 to 7, wherein the UE includes a multicast-broadcast service client associated with providing a service to a multicast-broadcast aware application via at least one call to an application programming interface.

Aspect 9: The method of any of Aspects 4 to 8, wherein the multicast-broadcast user service announcement comprises a user service description bundle including one or more user services, wherein each user service, of the one or more user services, includes one or more multicast-broadcast delivery sessions mapped to one or more multicast broadcast sessions associated with a core network.

Aspect 10: The method of any of Aspects 4 to 9, wherein the multicast-broadcast user service announcement includes an application service information message, wherein the application service information message identifies one or more applications or libraries associated with a service.

Aspect 11: The method of any of Aspects 4 to 9, wherein a multicast-broadcast service (NBS) client of the UE includes the MBSF client and the MBSTF client.

Aspect 12: The method of Aspect 11, wherein traffic associated with a multimedia streaming service is transferred in association with a multicast-broadcast service associated with the MBSF client, wherein the MBSF client includes an application server function.

Aspect 13: A method of wireless communication performed by a network entity, comprising: transmitting, to a user equipment (UE), a multicast-broadcast user service description message; and communicating, using a multicast-broadcast service (NBS) transport function (MBSTF) entity, with an MBSTF client of the UE, in accordance with information included in the user service description message, wherein the NBS entity is split into a multicast delivery function and a unicast application server.

Aspect 14: The method of Aspect 13, wherein the user service description is a 5G multicast-broadcast user service description.

Aspect 15: The method of any of Aspects 13 to 14, wherein the NBS entity and the MBSTF client communicate via a multicast-broadcast service-4-multicast (MBS-4-MC) interface for multicast traffic associated with the multicast delivery function and a multicast-broadcast service-4-unicast (MBS-4-UC) interface for unicast traffic associated with the unicast application server.

Aspect 16: The method of any of Aspects 13 to 15, further comprising: transmitting, to a multicast-broadcast service function (NMBSF) client of the UE and from an MBSF entity of the network entity, a multicast-broadcast user service announcement; and establishing a multicast-broadcast user service based at least in part on the multicast-broadcast user service announcement.

Aspect 17: The method of Aspect 16, wherein the multicast-broadcast user service is established based at least in part on an instruction from the NBS entity or the MBSTF client.

Aspect 18: The method of any of Aspects 16 to 17, wherein the multicast-broadcast user service includes one or more delivery sessions, and wherein a delivery session, of the one or more delivery sessions, includes one or more traffic flows.

Aspect 19: The method of Aspect 18, wherein the delivery session is associated with transfer of traffic associated with an application data session associated with a multicast-broadcast application provider.

Aspect 20: The method of any of Aspects 18 to 19, wherein the UE includes a multicast-broadcast service (NBS) client associated with providing a service to a multicast-broadcast aware application via at least one call to an application programming interface.

Aspect 21: The method of any of Aspects 16 to 20, wherein the multicast-broadcast user service announcement comprises a user service description bundle including one or more user services, wherein each user service, of the one or more user services, includes one or more multicast-broadcast delivery sessions mapped to one or more multicast broadcast sessions associated with a core network.

Aspect 22: The method of any of Aspects 16 to 21, wherein the multicast-broadcast user service announcement includes an application service information message, wherein the application service information message identifies one or more applications or libraries associated with a service.

Aspect 23: The method of any of Aspects 16 to 22, wherein a multicast-broadcast service (MBS) client of the UE includes the MBSF client and the MBSTF client.

Aspect 24: The method of Aspect 23, wherein traffic associated with a multimedia streaming service is transferred in association with a multicast-broadcast service associated with the MBSF client, wherein the MBSF client includes an application server function.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising a processor; memory coupled with the processor; and instructions stored in the memory and executable by the processor to cause the apparatus to perform the method of one or more of Aspects 13-24.

Aspect 31: A device for wireless communication, comprising a memory and one or more processors coupled to the memory, the one or more processors configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive, using a multicast-broadcast service function (MBSF) client, a multicast-broadcast user service announcement from an MBSF entity of a network entity,
wherein the multicast-broadcast user service announcement comprises a user service description bundle, wherein the user service description bundle includes a set of user services, and
wherein the set of user services includes a set of delivery sessions; and
communicate, using a multicast-broadcast service (MBS) transport function (MBSTF) client, with an MBS entity of the network entity, in accordance with information included in the multicast-broadcast user service announcement, wherein the MBS entity is split into a multicast delivery function and a unicast application server.

2. The UE of claim 1, wherein the multicast-broadcast user service announcement is a 5G multicast-broadcast user service announcement.

3. The UE of claim 1, wherein the MBS entity and the MBSTF client communicate via a multicast-broadcast service-4-multicast (MBS-4-MC) interface for multicast traffic associated with the multicast delivery function and a multicast-broadcast service-4-unicast (MBS-4-UC) interface for unicast traffic associated with the unicast application server.

4. The UE of claim 1, wherein the one or more processors are further configured to:
establish a multicast-broadcast user service based at least in part on the multicast-broadcast user service announcement.

5. The UE of claim 4, wherein the multicast-broadcast user service is established based at least in part on an instruction from the MBS entity or the MBSTF client.

6. The UE of claim 4, wherein the multicast-broadcast user service includes one or more delivery sessions, and
wherein a delivery session, of the one or more delivery sessions, includes one or more traffic flows.

7. The UE of claim 6, wherein the delivery session is associated with transfer of traffic associated with an application data session associated with a multicast-broadcast application provider.

8. The UE of claim 6, wherein the MBSF client is associated with providing a service to a multicast-broadcast aware application via at least one call to an application programming interface.

9. The UE of claim 1, wherein each user service, of the one or more user services, includes one or more multicast-broadcast delivery sessions mapped to one or more multicast broadcast sessions associated with a core network.

10. The UE of claim 1, wherein the multicast-broadcast user service announcement includes an application service information message, wherein the application service information message identifies one or more applications or libraries associated with a service.

11. The UE of claim 1, wherein a MBS client of the UE includes the MBSF client and the MBSTF client.

12. The UE of claim 1, wherein traffic associated with a multimedia streaming service is transferred in association with a multicast-broadcast service associated with the MBSF client, wherein the MBSF client includes an application server function.

13. A network entity for wireless communication, comprising:
one or more memories; and
one or more processors, coupled to the one or more memories, configured to:
transmit, using a multicast-broadcast service function (MBSF) entity and to a MBSF client of a user equipment (UE), a multicast-broadcast user service announcement,
wherein the multicast-broadcast user service announcement comprises a user service description bundle,
wherein the user service description bundle includes a set of user services, and
wherein the set of user services includes a set of delivery sessions; and
communicate, using a multicast-broadcast service (MBS) entity, with an MBS transport function (MBSTF) client of the UE, in accordance with information included in the multicast-broadcast user service announcement, wherein the MBS entity is split into a multicast delivery function and a unicast application server.

14. The network entity of claim 13, wherein the multicast-broadcast user service announcement is a 5G multicast-broadcast user service announcement.

15. The network entity of claim 13, wherein the MBS entity and the MBSTF client communicate via a multicast-broadcast service-4-multicast (MBS-4-MC) interface for multicast traffic associated with the multicast delivery function and a multicast-broadcast service-4-unicast (MBS-4-UC) interface for unicast traffic associated with the unicast application server.

16. The network entity of claim 13, wherein the one or more processors are further configured to:
establish a multicast-broadcast user service based at least in part on the multicast-broadcast user service announcement.

17. The network entity of claim 16, wherein the multicast-broadcast user service is established based at least in part on an instruction from the MBS entity or the MBSTF client.

18. The network entity of claim 16, wherein the multicast-broadcast user service includes one or more delivery sessions, and
wherein a delivery session, of the one or more delivery sessions, includes one or more traffic flows.

19. The network entity of claim 18, wherein the delivery session is associated with transfer of traffic associated with an application data session associated with a multicast-broadcast application provider.

20. The network entity of claim 18, wherein the UE includes a MBS client associated with providing a service to a multicast-broadcast aware application via at least one call to an application programming interface.

21. The network entity of claim 13, wherein each user service, of the one or more user services, includes one or more multicast-broadcast delivery sessions mapped to one or more multicast broadcast sessions associated with a core network.

22. The network entity of claim 13, wherein the multicast-broadcast user service announcement includes an application service information message, wherein the application service information message identifies one or more applications or libraries associated with a service.

23. The network entity of claim 13, wherein a MBS client of the UE includes the MBSF client and the MBSTF client.

24. The network entity of claim 13, wherein traffic associated with a multimedia streaming service is transferred in association with a multicast-broadcast service associated with the MBSF client, wherein the MBSF client includes an application server function.

25. A method of wireless communication performed by a user equipment (UE), comprising:

receiving, using a multicast-broadcast service function (MBSF) client, a multicast-broadcast user service announcement from an MBSF entity of a network entity,
- wherein the multicast-broadcast user service announcement comprises a user service description bundle,
- wherein the user service description bundle includes a set of user services, and
- wherein the set of user services includes a set of delivery sessions; and communicating, using a multicast-broadcast service (MBS) transport function (MBSTF) client, with an MBS entity of the network entity, in accordance with information included in the multicast-broadcast user service announcement, wherein the MBS entity is split into a multicast delivery function and a unicast application server.

26. The method of claim 25, wherein the multicast-broadcast user service announcement is a 5G multicast-broadcast user service announcement.

27. The method of claim 25, wherein the MBS entity and the MBSTF client communicate via a multicast-broadcast service-4-multicast (MBS-4-MC) interface for multicast traffic associated with the multicast delivery function and a multicast-broadcast service-4-unicast (MBS-4-UC) interface for unicast traffic associated with the unicast application server.

28. The method of claim 25, further comprising:
establishing a multicast-broadcast user service based at least in part on the multicast-broadcast user service announcement.

29. A method of wireless communication performed by a network entity, comprising:

transmitting, using a multicast-broadcast service function (MBSF) entity and to a MBSF client of a user equipment (UE), a multicast-broadcast user service announcement,
- wherein the multicast-broadcast user service announcement comprises a user service description bundle,
- wherein the user service description bundle includes a set of user services, and
- wherein the set of user services includes a set of delivery sessions; and communicating, using a multicast-broadcast service (MBS) entity, with an MBS transport function (MBSTF) client of the UE, in accordance with information included in the multicast-broadcast user service announcement, wherein the MBS entity is split into a multicast delivery function and a unicast application server.

30. The method of claim 29, wherein the multicast-broadcast user service announcement is a 5G multicast-broadcast user service announcement.

* * * * *